H. W. PIKE.

Improvement in Car-Couplings.

No. 125,985. Patented April 23, 1872.

Witnesses:
E. Wolff.
Alex F. Roberts

Inventor:
H. W. Pike
per [Attorneys signature]
Attorneys.

125,985

UNITED STATES PATENT OFFICE.

HENRY W. PIKE, OF MIDDLEPORT, NEW YORK.

IMPROVEMENT IN CAR-COUPLINGS.

Specification forming part of Letters Patent No. 125,985, dated April 23, 1872.

Specification describing a new and Improved Car-Coupling, invented by HENRY W. PIKE, of Middleport, in the county of Niagara and State of New York.

In this improved car-coupling the upper wall of the socket in the drawhead for the link is formed by the short arm of the lever, pivoted a short distance behind the coupling-pin, and extending rearward a considerable distance along a long vertical slot of the drawhead, and resting at the rear end on the end of the short arm of another lever, the long arm of which extends to the coupling-pin, and is connected below the drawhead to a yoke extending over the top of the drawhead, and through which the coupling-pin passes, all constituting a self-coupling apparatus, which will also uncouple self-actingly when one car runs off and the coupling-link is considerably lower at one end than the other.

Figure 1:
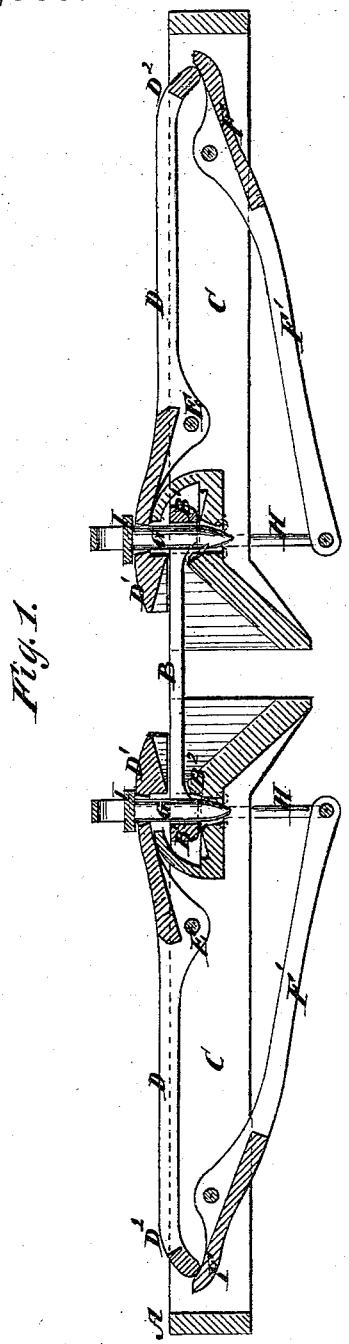
Figure 2:
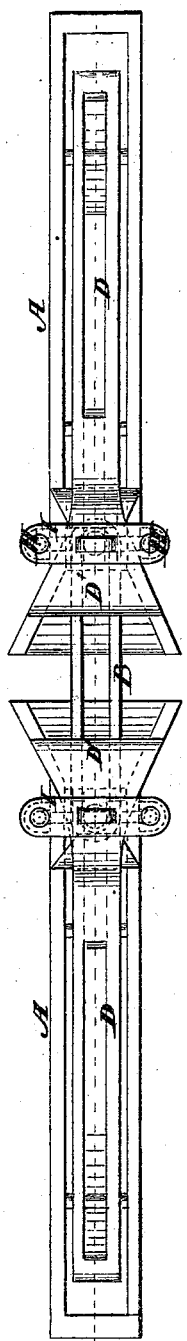

Figure 1 is a longitudinal sectional elevation of my improved car-coupling, and Fig. 2 is a plan view.

Similar letters of reference indicate corresponding parts.

A represents the drawheads, which have each a long vertical slot, C, behind the socket in the end, said slot being for reception of the coupling-link B. D is the lever, whose short arm $D^1$ forms the upper wall of the socket of the drawhead. Said lever is pivoted at E, a short distance behind the coupling-pin, to swing vertically, and the rear end $D^2$ rests upon the short arm F of a lever whose long arm F' extends along under the drawhead to a point below the coupling-pin G, and connects with a yoke, H, whose upper bar I crosses the top $D^1$ of the buffer, and the coupling-pin passes through it and is lifted by it when said bar rises. The coupling-link B has an enlarged or thickened portion, $B^1$, on the lower side of the end, which raises the end $D^1$ of the top lever slightly where it enters the drawhead, which, causing the long arm to act on the short arm of the lower lever, will lift the coupling-pin so high that the coupling-link will enter readily under it, and after entering said thickened part falls behind a ledge, $B^2$, and lets the top D and the coupling-pin fall, so that the latter secures the link, thus constituting a self-coupling apparatus; and the arrangement is such, that if one car runs off and one end of the link falls much lower and turns around the coupling-pin much more than in the ordinary working condition, the end of the link will throw the top $D^1$ up sufficiently to cause the coupling-pin to be quickly thrown out, all of which will be clearly understood by inspection of the drawing.

Having thus described my invention, I claim as new and desire to secure by Letters Patent—

The combination of the levers D $D^1$ F F', yoke H I, coupling-pin G, link B $B^1$, and ledge $B^2$, with the drawhead, all substantially as specified.

HENRY W. PIKE.

Witnesses:
C. R. BLAKSLEE,
WM. D. HOYT.